(12) United States Patent
Baker (10) Patent No.: US 7,134,758 B1
(45) Date of Patent: Nov. 14, 2006

(54) PRIVACY SCREEN FOR LAPTOP COMPUTER

(76) Inventor: Michael R. Baker, 2804 Lakeway Blvd., Lakeway, TX (US) 78734

( * ) Notice: Subject to any disclaimer, the term of this patent is extended or adjusted under 35 U.S.C. 154(b) by 21 days.

(21) Appl. No.: 11/147,361

(22) Filed: Jun. 8, 2005

(51) Int. Cl.
*G06F 1/16* (2006.01)

(52) U.S. Cl. .................. 359/601; 359/612; 348/842

(58) Field of Classification Search ............. 359/601, 359/610–613; 348/834, 842
See application file for complete search history.

(56) References Cited

U.S. PATENT DOCUMENTS

| | | | |
|---|---|---|---|
| 3,733,436 A * | 5/1973 | Rose ........................ | 348/842 |
| 4,314,280 A * | 2/1982 | Rose ........................ | 348/842 |
| 4,444,465 A | 4/1984 | Giulie et al. | |
| 4,784,468 A | 11/1988 | Tierney | |
| 5,101,298 A | 3/1992 | Lentz et al. | |
| 5,218,474 A | 6/1993 | Kirschner | |
| 5,325,970 A | 7/1994 | Dillon et al. | |
| 5,400,903 A | 3/1995 | Cooley | |
| RE35,691 E | 12/1997 | Theirl et al. | |
| 5,717,566 A | 2/1998 | Tao | |
| D397,686 S | 9/1998 | Bregman et al. | |
| 5,818,635 A * | 10/1998 | Hohn et al. .............. | 359/612 |
| 5,905,546 A | 5/1999 | Giulie et al. | |
| 5,997,145 A | 12/1999 | Mora | |
| D422,579 S | 4/2000 | McBride | |
| 6,046,754 A | 4/2000 | Stanek | |
| 6,115,238 A | 9/2000 | Von Gutfeld | |
| 6,144,419 A | 11/2000 | Schmidt | |
| 6,152,567 A * | 11/2000 | LaForgia ................ | 359/609 |
| 6,356,439 B1 | 3/2002 | Schmidt | |
| 6,394,615 B1 | 5/2002 | Hill et al. | |
| 2003/0056817 A1* | 3/2003 | Miller et al. ............ | 135/117 |
| 2003/0223119 A1 | 12/2003 | Heiman | |

FOREIGN PATENT DOCUMENTS

| | | |
|---|---|---|
| DE | 10111861 A1 * | 9/2001 |
| WO | WO 99/33084 | 7/1998 |

\* cited by examiner

*Primary Examiner*—Mark A. Robinson
*Assistant Examiner*—Mark Consilvio
(74) *Attorney, Agent, or Firm*—Richard C. Litman (57) ABSTRACT

The privacy screen for laptop computer is an expandable hood that may be removably attached to a notebook computer. The privacy screen has an elastic fabric cover secured around an expandable frame. The frame has a plurality of telescoping rods attached to connector pieces using ball and socket joints, which allow the frame to expand concurrently in multiple directions. The screen may be assembled before sale, in which case the screen uses a fixed number of pieces in its frame and the fabric cover is permanently secured to the frame, or provided as a kit, in which cut-out sections of the fabric cover allow the end user to assemble the telescoping rods and connecting pieces as desired. The frame may be secured to the laptop using spring-biased clips.

13 Claims, 8 Drawing Sheets

PRIVACY SCREEN FOR LAPTOP COMPUTER

BACKGROUND OF THE INVENTION

1. Field of the Invention

The present invention relates to computer display screens. More specifically, the invention relates to a privacy screen for laptop and notebook computers that shields the computer display for privacy when the computer is used in areas accessible to the public.

2. Description of the Related Art

Laptop and notebook computers allow a user to work in virtually any locale. Wireless communication systems enable workers to send information from a notebook computer to the office, and receive other information in return. Many people therefore work on notebook computers while on public transportation, in coffee shops, or even while waiting in the doctor's office.

Because many employers are sensitive that others may gain access to their employees' work product, these computers must be secure, both from electronic access and from visual access to the display by the surrounding public. Not only is work product at risk, but many electronic notebook users enter credit card numbers, passwords, health insurance information, and other private information into their computers.

In addition, due to the variety of locales in which a notebook computer may be used, the lighting in those locales may not always be the best lighting for viewing a computer screen.

It is necessary for notebook computer users to be able to work securely and in a degree of privacy, while preserving, and even enhancing, quality lighting for viewing the computer display. Thus, a privacy screen for a laptop computer solving the aforementioned problems is desired.

SUMMARY OF THE INVENTION

The privacy screen for a laptop computer is an expandable hood that may be removably attached to a laptop or notebook computer to shield the computer display from the view of casual observers when the computer is used in areas accessible to the general public.

The privacy screen has an elastic fabric cover secured around an expandable frame. The fabric may be secured to the frame by straps of mating hook and loop fasteners. The hook and loop fasteners are attached to the inside surface of the fabric. The privacy screen may be secured to the laptop using spring-biased clips or an additional set of hook and loop fasteners. The clips attach to the back of the laptop.

The frame has a plurality of telescoping rods attached to connecting pieces using ball and socket joints. The ball and socket joints allow the frame to expand concurrently in multiple directions. The telescoping rods may extend axially and have ball connectors on either end for insertion into the socket of the ball and socket joints.

Connecting pieces having several different shapes are used in the frame to connect the telescoping rods together. Straight connectors are used to connect two telescoping rods axially. Elbow connectors are used to connect two telescoping rods at a right angle to each other. T-shaped connectors are used to connect three telescoping rods along an edge of the frame. Corner connectors are used to connect three telescoping rods in a corner of the frame. Top connectors are used to connect four telescoping rods along an edge of the center of the frame.

The screen may be assembled before sale, in which case the screen uses a set number of pieces in its frame and the fabric cover is secured to the frame. Alternatively, the screen sold as a kit for assembly after sale, in which case the fabric cover has cutouts that allow the end user to assemble the telescoping rods and connecting pieces as desired. Both embodiments have similar elements, with the kit embodiment having modifications to the connecting pieces and the fabric cover to allow the end user to easily assemble the privacy screen. The kit connecting pieces have holes in their sidewalls to allow the balls on the ends of the telescoping rods to be inserted into rear cavities in the straight, elbow, T-shaped, corner and top connectors. A slot in the sidewalls of the kit connectors allows the user to then pull the balls on the ends of the telescoping rods up into the joint sockets, snapping the balls into place once the balls pass a raised ridge around the interior of the connectors. The cutout sections of the kit fabric screen allow the end user to assemble and disassemble the frame by allowing access to the connections from outside the fabric screen.

Because of the telescoping rods forming the lengths of each section of the frame, the ball and socket joints allowing rotation of the rods about the connecting pieces, and the ability of the elastic fabric cover to stretch as needed, the privacy screen may be expanded in multiple directions. The user may expand the hood forward from the laptop monitor toward the user by pulling the front section of the frame. The user may also expand the privacy screen opening horizontally by pulling the left and right sides of the front section of the frame to the left and right, respectively. The user may also expand the privacy screen opening vertically by pulling the top side of the front section of the frame upwards. This expansion in multiple directions allows the user to adjust the privacy screen to allow viewing of the laptop monitor from different angles, while blocking light or view of the monitor in other directions.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a privacy screen for a laptop computer, designated generally as 10 in the figures. The privacy screen 10 is an expandable hood that may be removably attached to a laptop or notebook computer L.

Figure 1:
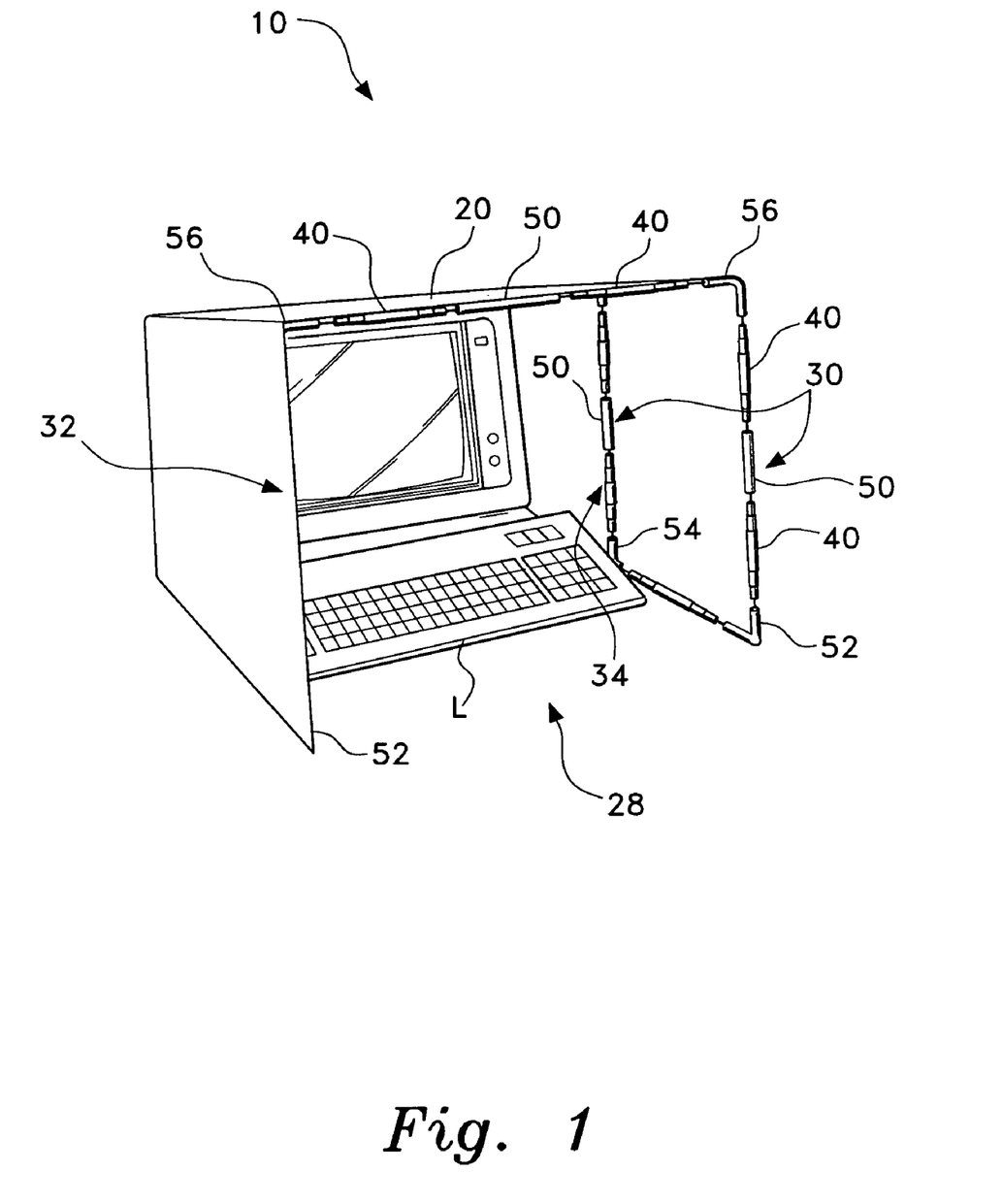
FIG. 1 is an environmental, perspective view of a privacy screen for a laptop computer according to the present invention.

The privacy screen 10 has an elastic fabric cover 20 secured around an expandable frame 30, as shown in FIG. 1. The fabric 20 may be secured to the frame 30 by straps of mating hook and loop fasteners 22 (shown in FIG. 7). The fabric 20 may be water-resistant or water-proof to provide the notebook computer L with protection from the weather. The hook and loop fasteners 22 are attached to the inside surface of the fabric 20. The privacy screen 10 may be secured to the laptop L using spring-biased clips 24 (also shown in FIG. 7) or hook and loop fasteners. The clips 24 attach to the back of the laptop L.

Figure 6:
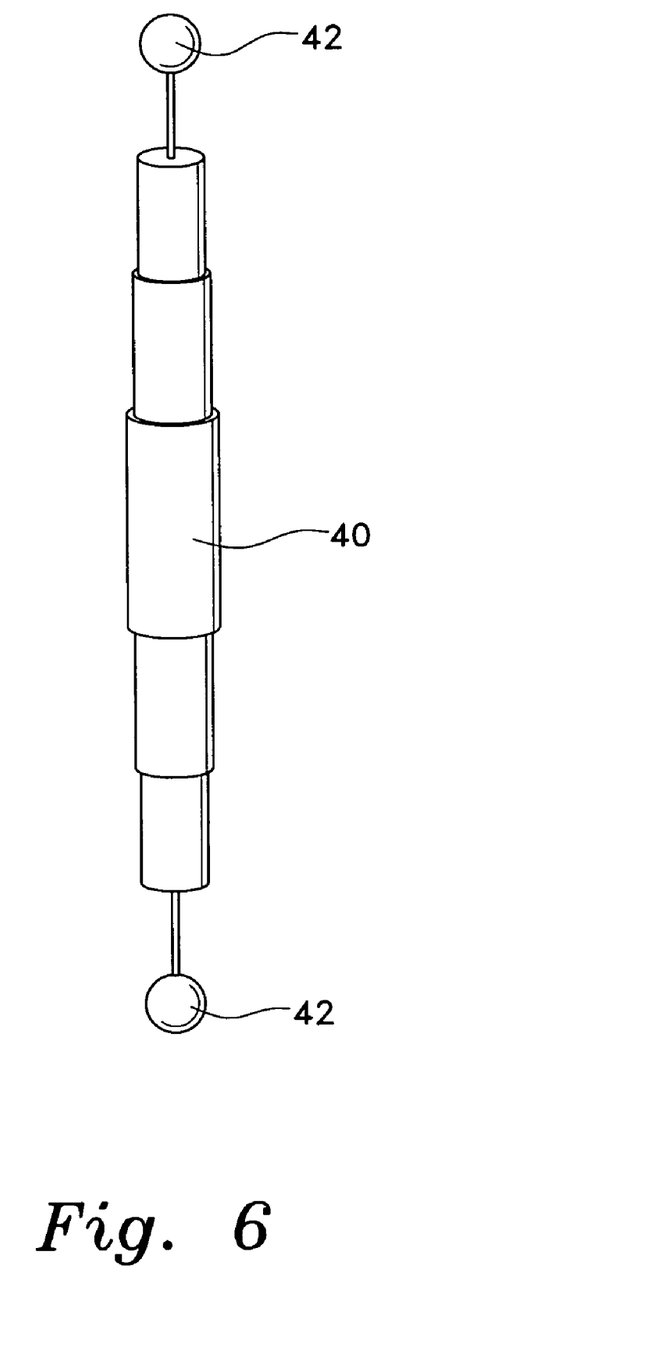
FIG. 6 is a perspective view of a telescoping rod for a privacy screen according to the present invention.

The frame 30 has a plurality of telescoping rods 40 attached to connector pieces using ball and socket joints. The ball and socket joints allow the frame 30 to expand concurrently in multiple directions. As shown in FIG. 6, the telescoping rods 40 may extend axially and have ball connectors 42 on both axial ends of the rods 40 to connect into the socket of the ball and socket joints.

Figures 2A, 2B, 2C, 2D:
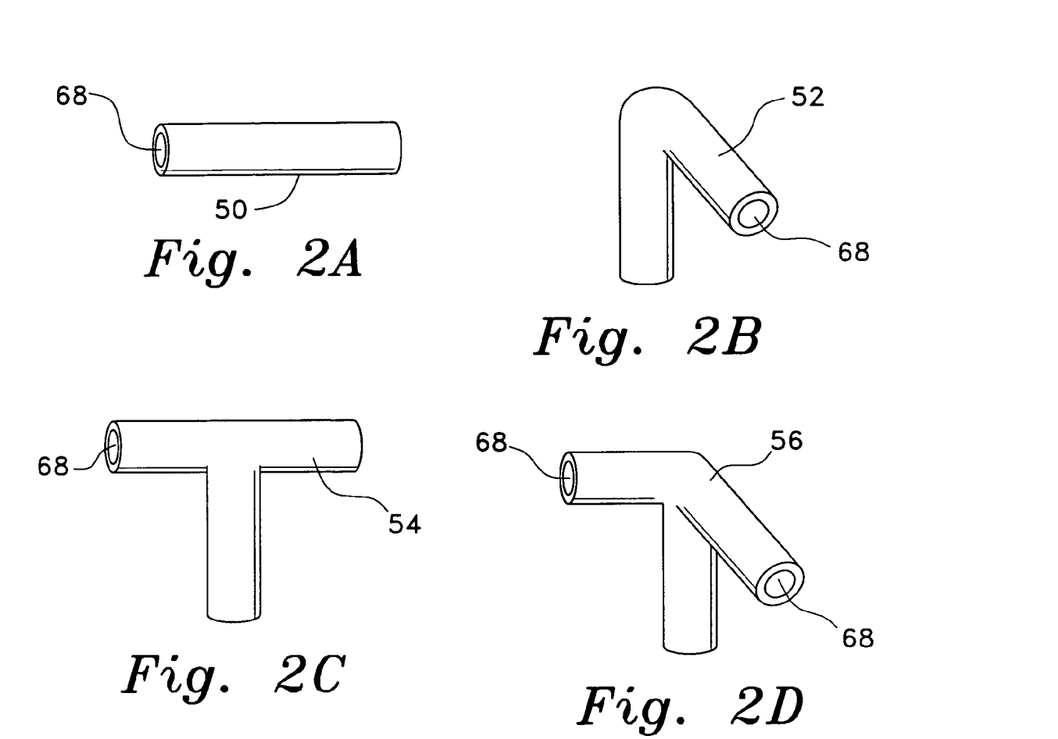
FIG. 2A through 2E are perspective views of connector pieces for a privacy screen according to the present invention.
Figure 3:
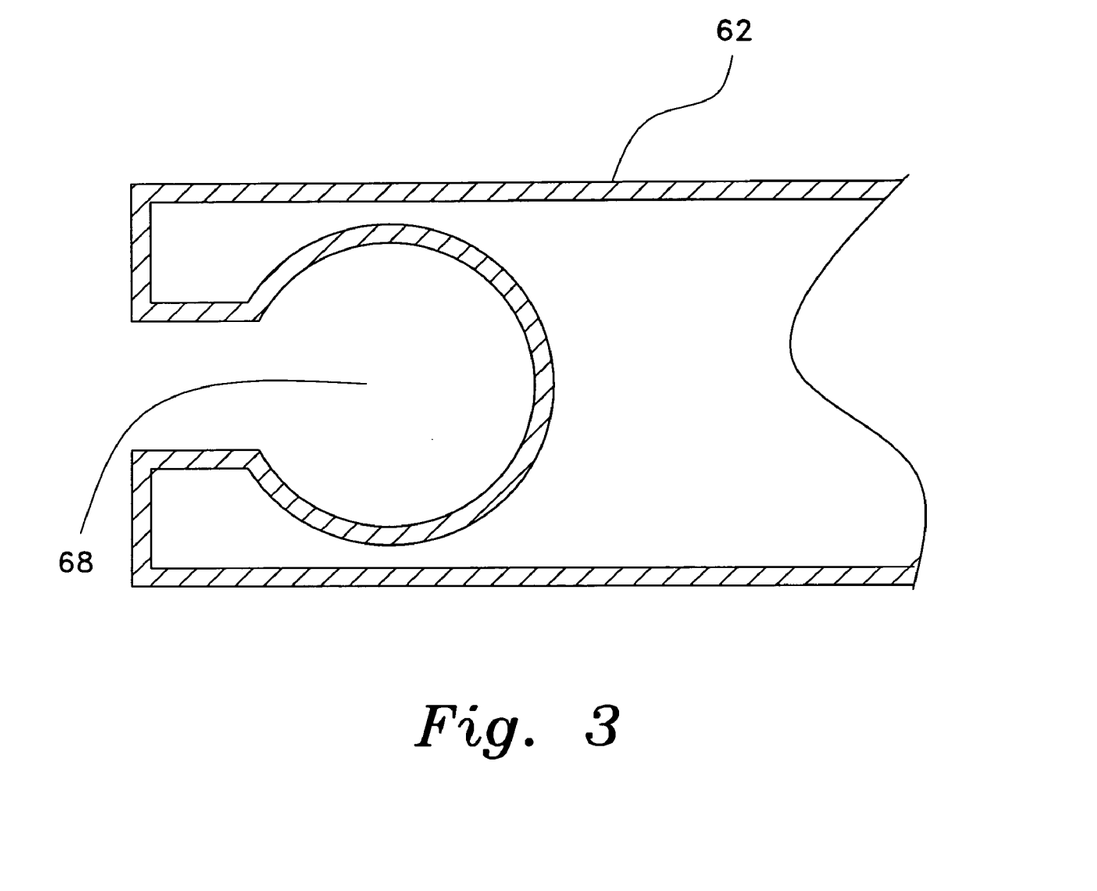
FIG. 3 is a cross-sectional side view of a connector socket for a privacy screen according to the present invention.
Figure 4A:
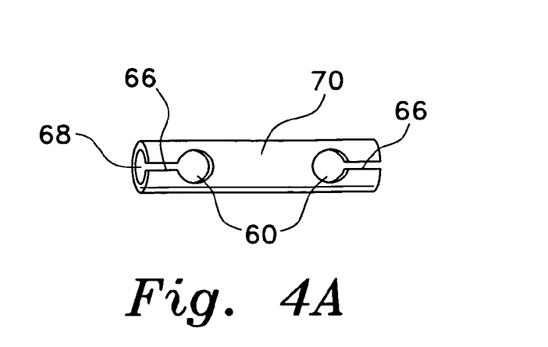
FIG. 4A through 4E are perspective views of connector pieces for a privacy screen kit according to the present invention.
Figure 4B:
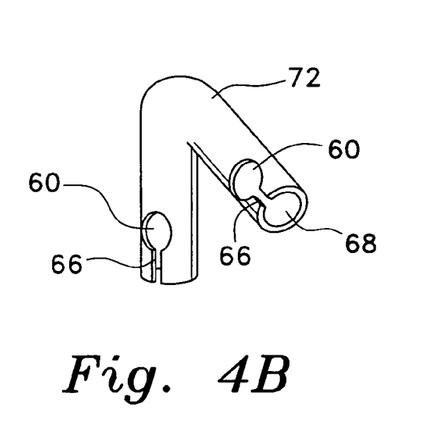
Figure 4C:
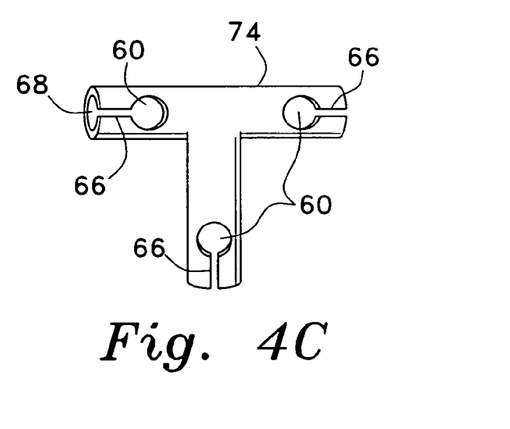
Figure 4D:
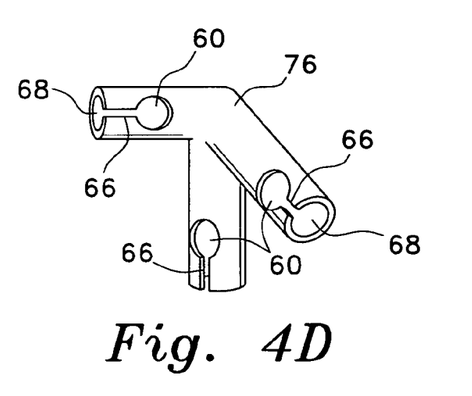
Figure 4E:
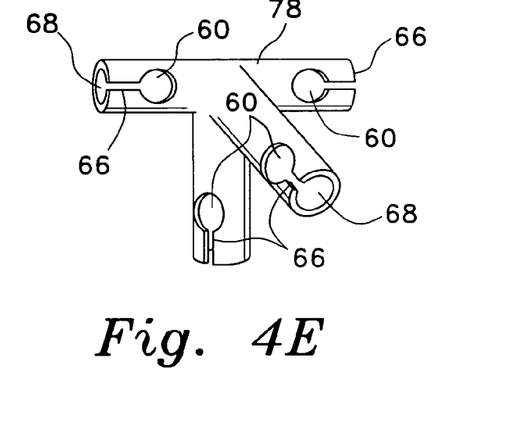
Figure 7:
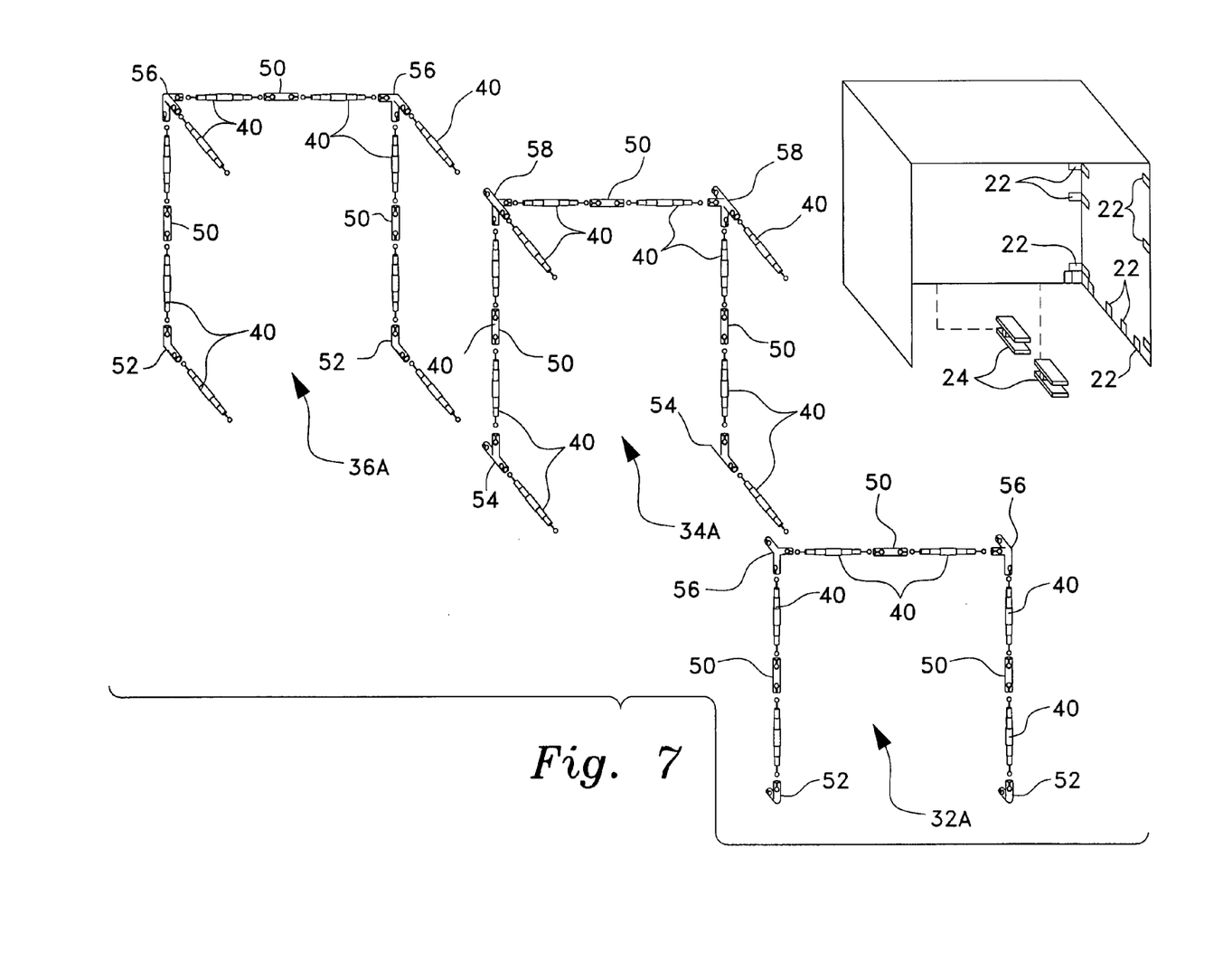
FIG. 7 is an exploded, perspective view of a privacy screen according to the present invention.

Connecting pieces having several different shapes are used in the frame 30 to connect the telescoping rods 40 together. Each connecting piece has a socket joint 68 in the end of each arm of the connecting piece, as shown in FIG. 3. FIG. 2A shows a straight connector 50, which is used to connect two telescoping rods 40 axially. The straight connectors 50 are used in the center of the top, left and right sides of the front section 32A, middle section 34A, and rear section 36A of the pre-assembled privacy screen 10, as shown in FIG. 7.

FIG. 2B shows an elbow connector 52, which is used to connect two telescoping rods 40 normal to each other. The elbow connectors 52 are used at the lower left and right sides of the front section 32A and rear section 36A of the pre-assembled privacy screen 10, as shown in FIG. 7.

FIG. 2C shows a T-shaped connector 54, which is used to connect three telescoping rods 40 along an edge of the frame 30. These T-shaped connectors 54 are used in the lower left and right sides of the middle section 34A of the pre-assembled privacy screen 10, as shown in FIG. 7.

FIG. 2D shows a corner connector 56, which is used to connect three telescoping rods 40 in a corner of the frame 30. These corner connectors 56 are used at the upper left and right sides of the front section 32A and rear section 36A of the pre-assembled privacy screen 10, as shown in FIG. 7.

Figure 2E:
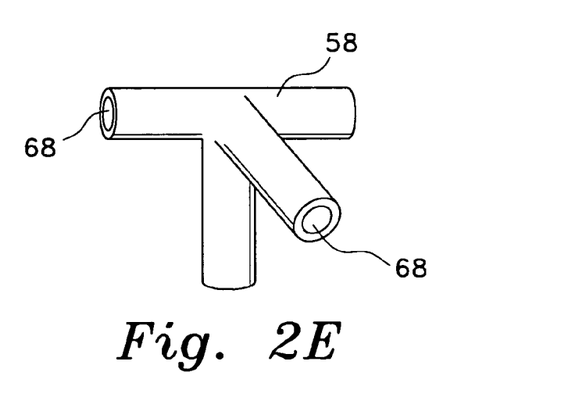

FIG. 2E shows a top connector 58, which is used to connect four telescoping rods 40 along an edge of the middle section 34 of the frame 30. These top connectors 58 are used in the lower left and right sides of the middle section 34A of the pre-assembled privacy screen 10, as shown in FIG. 7.

Figure 5:
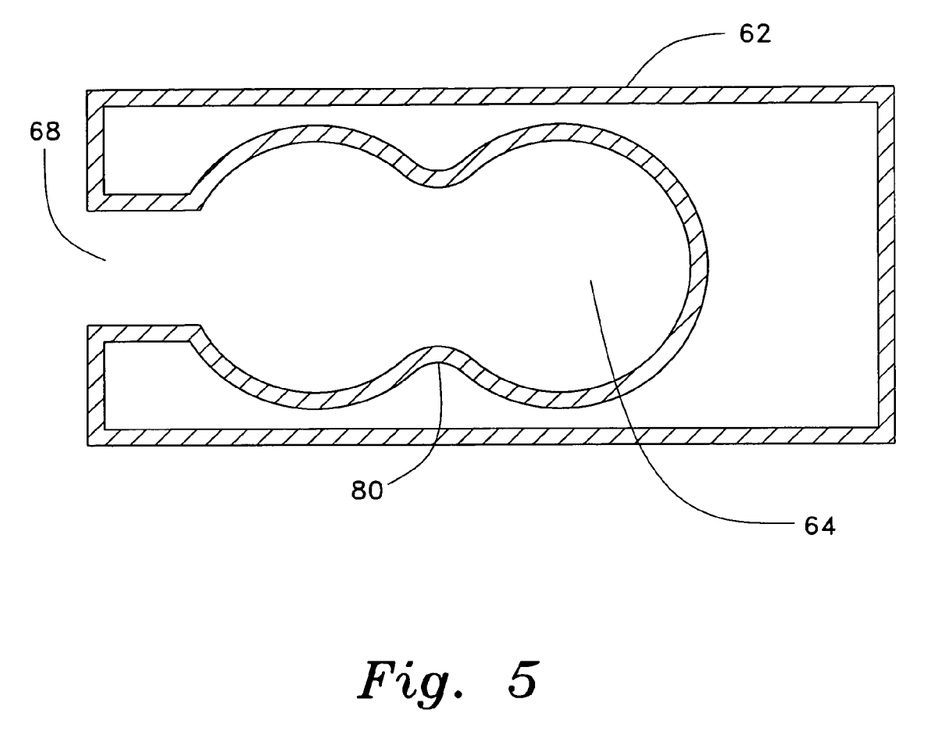
FIG. 5 is a cross-sectional side view of a connector socket for a privacy screen kit according to the present invention.
Figure 8:
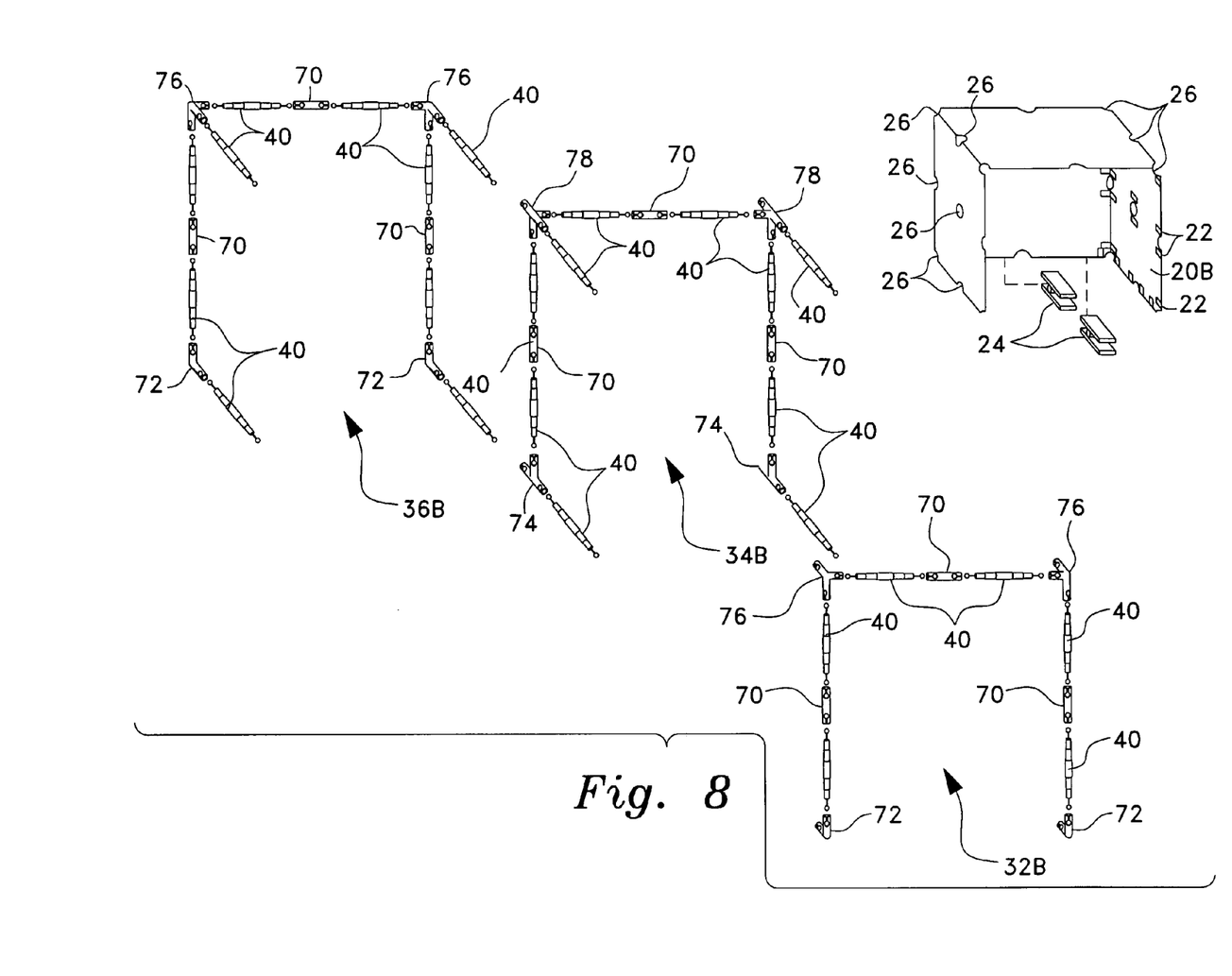
FIG. 8 is an exploded, perspective view of a privacy screen kit according to the present invention.

The screen 10 may be assembled before sale, in which case the screen 10 uses a fixed number of pieces in the frame 30 and the fabric cover is secured to the frame 30, or may be sold as kit for assembly after sale, in which cut-out sections 26 of the fabric cover 20B, as shown in FIG. 8, allow the end user to assemble the telescoping rods 40 and connecting pieces as desired. Both embodiments have similar elements, with the kit embodiment having modifications to the connecting pieces and the fabric cover 20B to allow the end user to assemble the privacy screen 10 more easily. As can be seen in FIGS. 4A through 4E, the kit connector pieces have holes 60 in their sidewalls 62 to allow the balls 42 on the ends of the telescoping rods 40 to be inserted into rear cavities 64 in the straight 70, elbow 72, T-shaped 74, corner 76 and top 78 connectors. A slot 66 in the sidewalls 62 of the kit connectors allows the user to then pull the balls 42 on the ends of the telescoping rods 40 up into the joint sockets 68, snapping the balls 42 into place once the balls 42 pass a raised ridge 80 around the interior of the connectors, as shown in FIG. 5. The cut-out sections 26 of the post-market fabric screen 20B allow the end user to assemble and disassemble the frame 30 by allowing access to the connectors from outside the fabric screen 20B, as shown in FIG. 8.

Because of the telescoping rods 40 forming the lengths of each section of the frame 30, the ball and socket joints allowing rotation of the rods 40 about the connecting pieces, and the ability of the elastic fabric cover 20 to stretch as needed, the privacy screen 10 may be expanded in multiple directions. Referring back to FIG. 1, the user may expand the privacy screen 10 forward from the laptop monitor L toward the user by pulling the front section 32 of the frame 30. The user may also expand the privacy screen opening 28 horizontally by pulling the left and right sides of the front section 32 of the frame 30 to the left and right, respectively. The user may also expand the privacy screen opening 28 vertically by pulling the top side of the front section 32 of the frame 30 upwards. This expansion in multiple directions allows the user to adjust the privacy screen 10 to allow viewing of the laptop monitor L from different angles, while blocking light that might otherwise strike the computer display, enhancing clarity of the LCD screen, and blocking the view casual observers so that they cannot see the contents of the computer display area.

It is to be understood that the present invention is not limited to the embodiments described above, but encompasses any and all embodiments within the scope of the following claims.

I claim:

1. A privacy screen for a laptop computer, comprising:
   a plurality of telescoping rods, each of the rods having a ball attached to opposite ends of the rod;
   a plurality of connectors, each of the connectors defining at least two sockets, the telescoping rods being joined together by ball and socket joints formed by the rod balls and the connector sockets in order to define an expandable frame;
   an elastic fabric cover attached to the frame; and
   means for attaching the fabric cover to the laptop computer, the frame being extendible vertically, laterally, and axially in order to shield a display area of the laptop computer for privacy.

2. The privacy screen according to claim 1, wherein said frame further comprises:
   a rear section adapted for attachment to the laptop;
   a front section defining an opening for permitting a user to view the laptop display area; and
   at least one middle section extending between the front section and the rear section, the front, middle and rear sections defining a framework for a top wall and two opposing sidewalls depending from the top wall in order to screen the display area laterally and from above.

3. The privacy screen according to claim 1, wherein said means for attaching comprises at least one spring-biased clip extending from the fabric cover adapted for attachment to the laptop computer.

4. The privacy screen according to claim 1, wherein said fabric cover further comprises a top wall, two opposing side walls depending from opposite sides of the top wall, and a rear wall depending from the top wall and extending between the side walls.

5. The privacy screen according to claim 1, further comprising a plurality of mating hook and loop fasteners attaching said telescoping rods to said fabric cover.

6. The privacy screen according to claim 1, wherein said plurality of connectors includes at least one linear connector joining two of the telescoping rods extending laterally in said frame.

7. The privacy screen according to claim 1, wherein said plurality of connectors includes at least one elbow connector joining three of the telescoping rods to form a foot of said frame.

8. The privacy screen according to claim 1, wherein said plurality of connectors includes at least one T-connector joining two of the telescoping rods along a sidewall of the frame.

9. The privacy screen according to claim 1, wherein said plurality of connectors includes at least one corner connector having two legs joined normal to each other to define a plane and a third leg extending from the junction of the two legs normal to the plane, the corner connector joining three of the telescoping rods to form a top corner of said frame.

10. The privacy screen according to claim 1, wherein said plurality of connectors includes at least one top connector having three legs joined to form a T-configuration defining a plane and a fourth leg extending from the junction of the three legs normal to the plane, the top connector joining four of the telescoping rods to form an intermediate top junction of said frame.

11. The privacy screen according to claim 1, wherein said fabric cover is permanently joined to said frame, said cover being continuous in order to restrict access to said connectors.

12. The privacy screen according to claim 1, wherein said fabric cover has a plurality of openings defined therein in order to provide access to said connectors.

13. The privacy screen according to claim 1, wherein said connectors have a cavity defined in front of each of the sockets, an annular ridge disposed between the cavity and the socket, and a slot defined in the connector extending up to the socket, whereby the telescoping rod ball is inserted into the cavity, the rod sliding through the slot, and the ball snapping over the annular ridge into the socket in order to form the ball and socket joint.

* * * * *